United States Patent
Kawada et al.

(10) Patent No.: US 11,033,967 B2
(45) Date of Patent: Jun. 15, 2021

(54) LAMINATION MOLDING APPARATUS

(71) Applicant: Sodick Co., Ltd., Kanagawa (JP)

(72) Inventors: Shuichi Kawada, Kanagawa (JP); Satoshi Nomiyama, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 584 days.

(21) Appl. No.: 15/415,870

(22) Filed: Jan. 26, 2017

(65) Prior Publication Data

US 2017/0297105 A1    Oct. 19, 2017

(30) Foreign Application Priority Data

Apr. 18, 2016    (JP) .............................. JP2016-082747

(51) Int. Cl.
| | |
|---|---|
| *B22F 12/00* | (2021.01) |
| *B33Y 30/00* | (2015.01) |
| *B33Y 40/00* | (2020.01) |
| *B22F 3/24* | (2006.01) |
| *B22F 10/10* | (2021.01) |

(52) U.S. Cl.
CPC .............. *B22F 12/00* (2021.01); *B22F 3/24* (2013.01); *B33Y 30/00* (2014.12); *B33Y 40/00* (2014.12); *B22F 10/10* (2021.01); *B22F 2003/247* (2013.01)

(58) Field of Classification Search
CPC .. B22F 3/1055; B22F 3/24; B22F 2003/1056; B22F 2003/247; B33Y 30/00; B33Y 40/00
See application file for complete search history.

(56) References Cited

U.S. PATENT DOCUMENTS

| | | | | |
|---|---|---|---|---|
| 5,228,929 | A | * 7/1993 | Panasiuk | .................... B22F 3/24 148/220 |
| 2003/0004599 | A1 | * 1/2003 | Herbak | ................. B29C 64/106 700/119 |
| 2004/0182200 | A1 | * 9/2004 | Takiguchi | ................. B22F 3/24 75/246 |

(Continued)

FOREIGN PATENT DOCUMENTS

| | | |
|---|---|---|
| JP | H01-502890 | 10/1989 |
| JP | 2000073108 | 3/2000 |

(Continued)

OTHER PUBLICATIONS

KR-920006992-B1 WIPO Patentscope Translated Claims and Specification (Year: 2021).*

*Primary Examiner* — Francisco W Tschen
*Assistant Examiner* — Guy F Mongelli
(74) *Attorney, Agent, or Firm* — JCIPRNET

(57) ABSTRACT

A lamination molding apparatus is provided capable of preventing damage to a cutting device. Every time a sintered body including a sintered layer group consisting of a predetermined number of sintered layers is formed, gas is injected from a gas injector toward a vicinity of a side surface of the newly formed sintered body so as to blow off material powder, and then the side surface of the sintered body is shaved by a cutting tool of the cutting device, wherein the gas injector blows off the material powder by only intermittent injection which repeats short-time gas injection or by a combination of the intermittent injection and continuous injection which continuously injects the gas.

5 Claims, 13 Drawing Sheets

(56) References Cited

U.S. PATENT DOCUMENTS

| | | | |
|---|---|---|---|
| 2005/0175750 A1* | 8/2005 | Sanders | C13B 20/00 |
| | | | 426/481 |
| 2006/0201355 A1* | 9/2006 | Kim | B01L 3/0268 |
| | | | 101/327 |
| 2007/0210132 A1* | 9/2007 | Akiba | B25C 1/08 |
| | | | 227/10 |
| 2013/0041049 A1* | 2/2013 | Bowe | C01B 3/34 |
| | | | 518/702 |
| 2013/0064707 A1 | 3/2013 | Matsui et al. | |
| 2014/0370323 A1* | 12/2014 | Ackelid | B22F 3/1055 |
| | | | 428/548 |
| 2015/0104346 A1* | 4/2015 | Nakamura | C22C 1/0433 |
| | | | 419/55 |
| 2015/0118380 A1* | 4/2015 | Doleyres | A23F 5/40 |
| | | | 426/569 |
| 2015/0174824 A1* | 6/2015 | Gifford | B29C 64/20 |
| | | | 425/183 |
| 2015/0287572 A1* | 10/2015 | Daugherty | H01J 37/3244 |
| | | | 438/694 |
| 2015/0367448 A1* | 12/2015 | Buller | B23K 26/346 |
| | | | 219/74 |
| 2016/0107229 A1* | 4/2016 | Okazaki | B29C 64/371 |
| | | | 425/78 |

FOREIGN PATENT DOCUMENTS

| | | | | |
|---|---|---|---|---|
| JP | 2015199972 | | 11/2015 | |
| JP | 2015199972 A | * | 11/2015 | ......... B23K 15/0086 |
| KR | 920006992 B1 | * | 8/1992 | ............ H04N 5/7826 |

\* cited by examiner

LAMINATION MOLDING APPARATUS

CROSS-REFERENCE TO RELATED APPLICATION

This application claims the priority benefit of Japan Application no. 2016-082747, filed on Apr. 18, 2016. The entirety of the above-mentioned patent application is hereby incorporated by reference herein and made a part of this specification.

BACKGROUND OF THE INVENTION

Field of the Invention

The invention relates to a lamination molding apparatus which fabricates a metal lamination molded object.

Description of the Related Art

Examples of an apparatus for fabricating a metal lamination molded object include a lamination molding apparatus described in Patent Document 1. In this lamination molding apparatus, a recoater head is moved in a horizontal uniaxial direction in a molding vessel, and, by a material storage box and a blade provided on the recoater head supplying and flattening metal material powder, a powder layer is formed. A predetermined area of the powder layer is irradiated by a laser irradiation device with a laser beam so as to form a sintered layer. Then, by repeating forming a new powder layer on the sintered layer and irradiating a laser beam thereon to form another sintered layer, a metal lamination molded object is fabricated.

In addition, in order to obtain a lamination molded object having high form accuracy, a method is known in which every time a sintered body including a sintered layer group consisting of a predetermined number of sintered layers is formed, a lamination molded object is molded while a side surface of the newly formed sintered body is shaved by a cutting device.

Here, the sintered body subjected to side surface cutting is buried up to a substantially upper surface thereof with the material powder that were not sintered by the laser beam. Thus, if the side surface cutting is performed in this state, cutting will proceed while a cutting tool is buried in the material powder. In such cutting, since the cutting tool proceeds while sucking in the material powder, the material powder is likely to bite into the cutting tool of the cutting device and cause damage.

Therefore, in a lamination molding apparatus described in Patent Document 2, during operation of the cutting device, by injection of gas toward a tip side of the cutting tool, the gas is blown against cutting powder attached to a surface of the cutting tool during cutting and the material powder in the vicinity of a cut portion. Accordingly, by removing the material powder in a moving path of the cutting tool while blowing off the cutting powder attached to the surface of the cutting tool, the cutting powder and the material powder are prevented from bitting into the cutting tool.

PRIOR-ART DOCUMENTS

Patent Documents

Patent Document 1: Japanese Translation of PCT Publication No. H1-502890

Patent Document 2: Japanese Patent Publication No. 2015-199972

DISCLOSURE OF THE INVENTION

Problems to be Solved

By the way, there are a variety of lamination molded objects fabricated by the lamination molding apparatus, and they sometimes have a complex shape. On a sintered body constituting such a lamination molded object, a small hole or a narrow groove may be formed. Hence, during the above-mentioned side surface cutting, cutting may also be performed on a side surface on which such small hole or narrow groove is formed. In this case, in order to prevent damage to the cutting tool during the cutting, the material powder that has entered such hole or groove must be removed.

Here, in the lamination molding apparatus described in Patent Document 2, as mentioned above, the cutting work is performed simultaneously with the gas blowing against the material powder in the vicinity of the cutting tool. In other words, when the sintered body is subjected to side surface cutting by this lamination molding apparatus, the side surface cutting will be performed while a passage of the cutting tool is formed. Thus, in order to prevent damage to the cutting tool caused by biting of the material powder, during the side surface cutting, gas must be continuously injected toward the material powder in the vicinity of the cutting tool so as to successively blow off the material powder in a moving path of the cutting tool.

However, in such continuous injection, when the material powder clogged in the small hole or narrow groove on the sintered body is about to come out of the hole or groove, it may be suppressed by a jet flow. Therefore, the material powder is difficult to remove. For that reason, in the lamination molding apparatus described in Patent Document 2, the material powder that remains without being removed is likely to bite into the cutting tool and cause damage.

The invention has been achieved in light of the above problems and provides a lamination molding apparatus capable of preventing damage to the cutting tool.

Means for Solving the Problems

A lamination molding apparatus according to a first aspect of the invention includes: a table on which a powder layer including metal material powder is formed; a laser irradiation device irradiating a predetermined region of the powder layer formed on the table with a laser beam so as to sinter the predetermined region of the powder layer to form a sintered layer; a cutting device having a cutting tool that cuts the sintered layer formed by the laser irradiation device; and a gas injector blowing off the material powder by gas injection, wherein every time a sintered body including a sintered layer group consisting of a predetermined number of sintered layers is formed, gas is injected from the gas injector toward a vicinity of a side surface of the newly formed sintered body so as to blow off the material powder, and then the side surface of the sintered body is shaved by the cutting tool, wherein the gas injector blows off the material powder by only intermittent injection which repeats short-time gas injection or by a combination of the intermittent injection and continuous injection which continuously injects the gas.

In the invention, every time the sintered body including the sintered layer group consisting of the predetermined number of sintered layers is formed, the gas is injected from the gas injector toward the vicinity of the side surface of the newly formed sintered body so as to blow off the material powder, and then the side surface of the sintered body is shaved by the cutting tool of the cutting device. At that time, the gas injector blows off the material powder by only the intermittent injection which repeats short-time gas injection or by a combination of the intermittent injection and the continuous injection which continuously injects the gas. According to gas injection having a short injection time, even if being clogged in a small hole or a narrow groove, the material powder can be gradually floated from an upper side thereof and blown off outside. Thus, by repeating such gas injection having a short injection time (intermittent injection), the material powder clogged in the small hole or narrow groove and difficult to remove by continuous injection can be removed. According to the above, since a space for the cutting tool to enter can be formed in the small hole or narrow groove with no cutting powder present, the cutting device can be prevented from being bitten into by the material powder during side surface cutting. Accordingly, the cutting tool can be prevented from being damaged.

In addition, in the case of a sintered body having a complex side surface shape on which a large number of small holes or narrow grooves are formed, only the intermittent injection is performed; in the case of a sintered body on which a small hole or a narrow groove and a large hole or a wide groove are formed, the intermittent injection is properly combined with continuous injection which is performed in the same location as the intermittent injection and which has a faster removal rate than the intermittent injection that performs a plurality of times of gas injection. Accordingly, the material powder in the vicinity of the side surface of the sintered body can be more efficiently and reliably removed.

The lamination molding apparatus according to a second aspect of the invention is characterized in that, in the first aspect of the invention, the gas injector blows off by gas injection the material powder at least to a depth allowing the cutting tool to enter.

In the invention, the gas injector blows off by gas injection the material powder at least to the depth allowing the cutting tool to enter. Accordingly, a space having a sufficient depth for the cutting tool to enter during side surface cutting can be formed in the vicinity of the side surface of the sintered body. Thus, the material powder can be prevented from biting into the cutting tool when the sintered body is subjected to side surface cutting.

The lamination molding apparatus according to a third aspect of the invention is characterized in that, in the first or second aspect of the invention, a strength of the gas injection performed by the gas injector is in a range of not blowing up the material powder.

Here, if the gas blown by the gas injector against the vicinity of the side surface of the sintered body is too strong, the material powder is blown up under the influence of the blown gas and the molding environment may deteriorate.

In the invention, the strength of the gas injection performed by the gas injector is in the range of not blowing up the material powder. Thus, the material powder in the vicinity of the side surface of the sintered body can be blown off without blowing up the material powder blown off by the gas. Accordingly, while a good molding environment is maintained, the material powder can be removed from the vicinity of the side surface of the sintered body.

The lamination molding apparatus according to a fourth aspect of the invention is characterized in that, in any one of the first to third aspects of the invention, a gas injection port of the gas injector has a circular shape, and the gas injected from the gas injection port is blown vertically.

In the invention, the gas injection port of the gas injector has a circular shape, and the gas injected from the gas injection port is blown vertically. Accordingly, size of the space formed by gas injection can be easily controlled. Thus, the material powder is prevented from being removed more than necessary, and the material powder replenished thereon when forming a new powder layer can be reduced.

Effects of the Invention

According to the invention, by performing intermittent injection, the material powder clogged in a small hole or a narrow groove formed on the sintered body can be removed. Accordingly, a space for the cutting tool of the cutting device to enter can be formed in the small hole or the narrow groove. Thus, during side surface cutting of the sintered body, the cutting tool of the cutting device can be prevented from being bitten into by the material powder and being damaged.

DESCRIPTION OF THE EMBODIMENTS

Hereinafter, an embodiment of the invention is explained with reference to the drawings.

Figure 1:
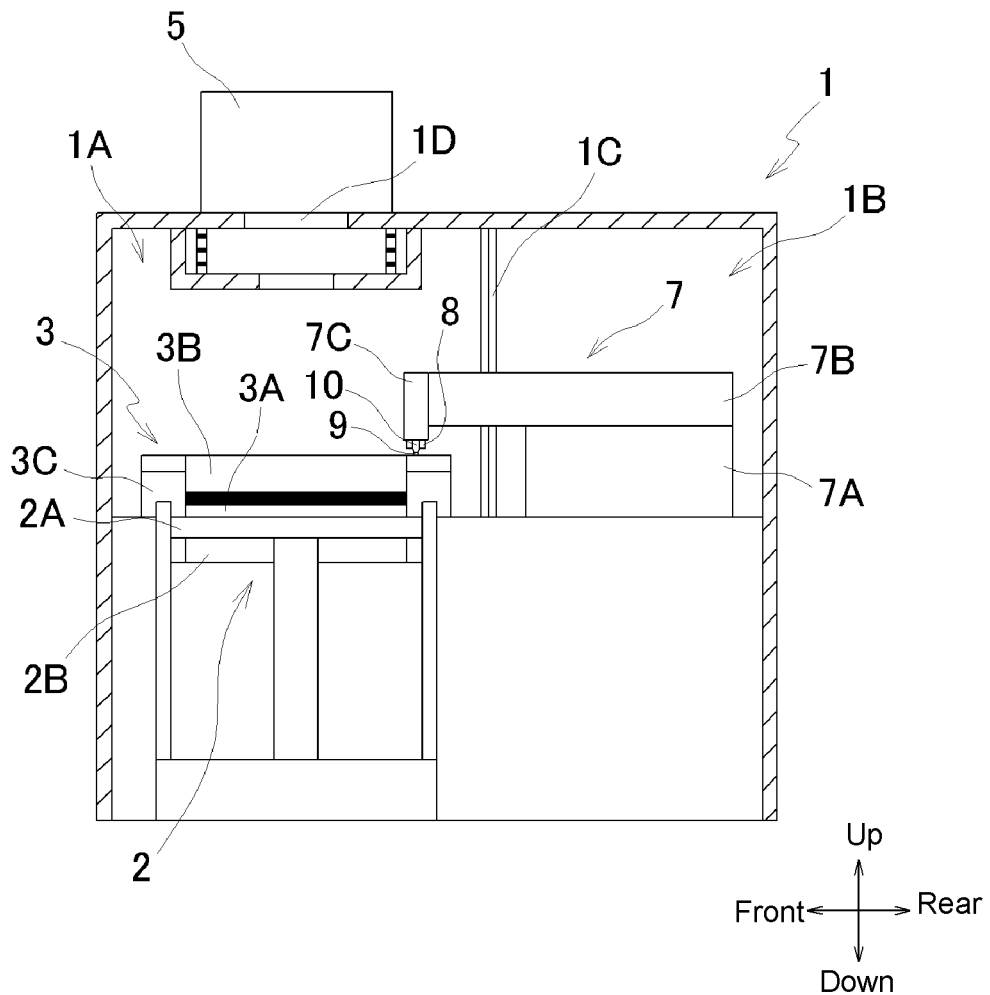
FIG. 1 is a schematic side view showing an overall structure of a lamination molding apparatus according to an embodiment.

A lamination molding apparatus 1 is a sintering type metal powder lamination molding apparatus. As shown in FIG. 1, the lamination molding apparatus 1 includes a molding chamber 1A provided in a molding vessel, and a driving device chamber 1B. The molding chamber 1A is disposed on a front side of the lamination molding apparatus 1. The driving device chamber 1B is disposed on a rear side of the lamination molding apparatus 1. The molding chamber 1A and the driving device chamber 1B are partitioned by a bellow 1C. An inert gas is supplied to the molding chamber 1A and the driving device chamber 1B from an inert gas supply device 12 shown in FIG. 6. Accordingly, during molding of a lamination molded object, oxygen concentration in the molding vessel may be reduced as much as possible. Moreover, in the following, the left side when viewing FIG. 1 is defined as front, the right side as rear, the near side as right, the far side as left, the upper side as upper, and the lower side as lower, and directional terms such as "front," "back," "right," "left," "up" and "down" are properly used for explanation.

A molding space for forming a lamination molded object is formed in the molding chamber 1A. Metal material powder is spread all over the molding space. A molding table 2A is accommodated in the molding chamber 1A. The molding space is formed over the entire upper side of the molding table 2A. Every time the molding table 2A forms a powder layer, the molding table 2A decreases in height as much as a thickness of the newly formed powder layer.

Figure 2:
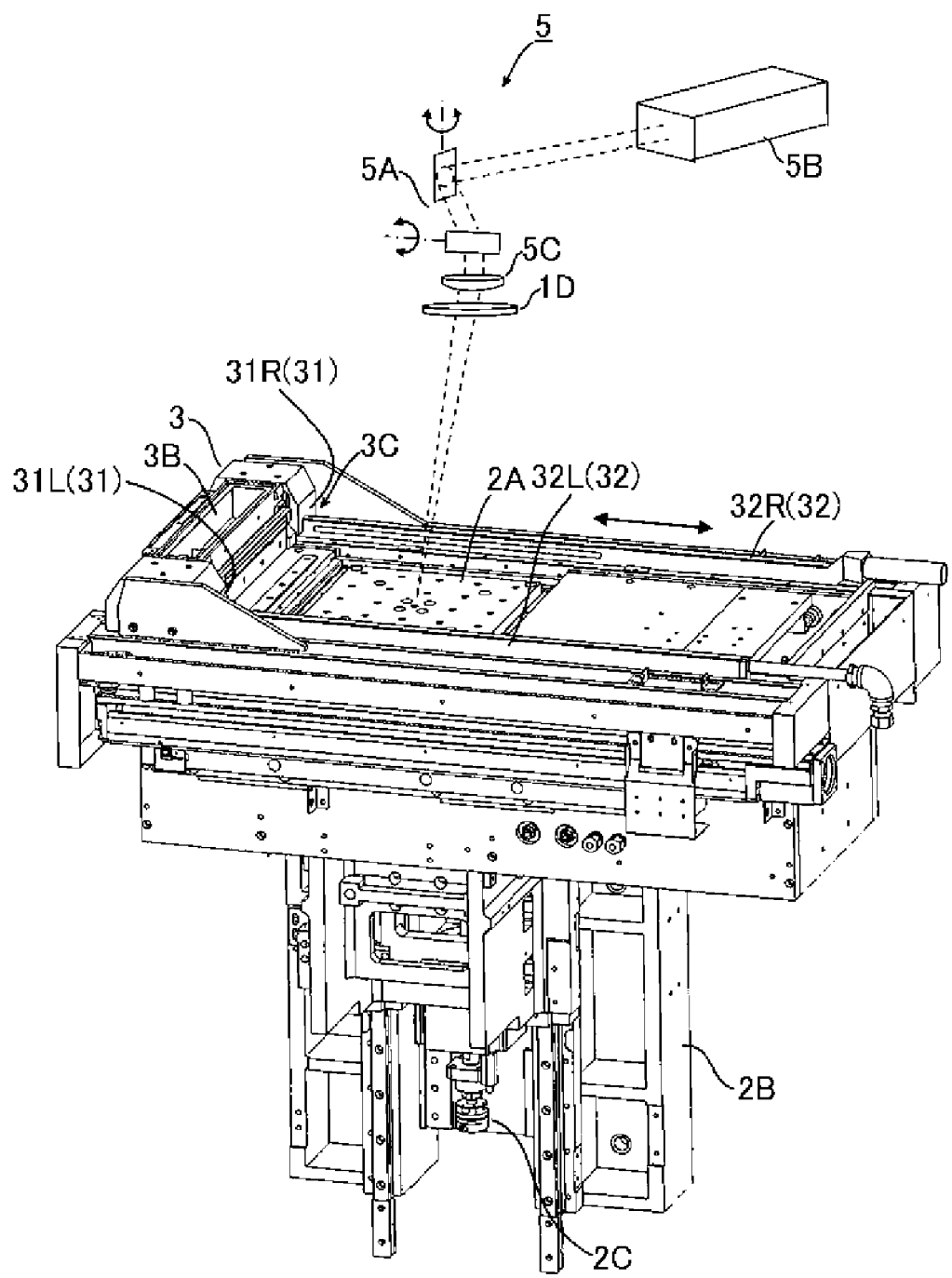
FIG. 2 is a perspective view showing a lower structure of the lamination molding apparatus.

As shown in FIG. 1 and FIG. 2, a powder layer forming device 2 includes the molding table 2A, a support mechanism 2B supporting as well as elevating and lowering the molding table 2A, a transmission mechanism 2C transmitting power to the support mechanism 2B, and a driving device including a motor (not illustrated) that drives the support mechanism 2B. In addition, the powder layer forming device 2 includes a recoater head 3.

Figure 3:
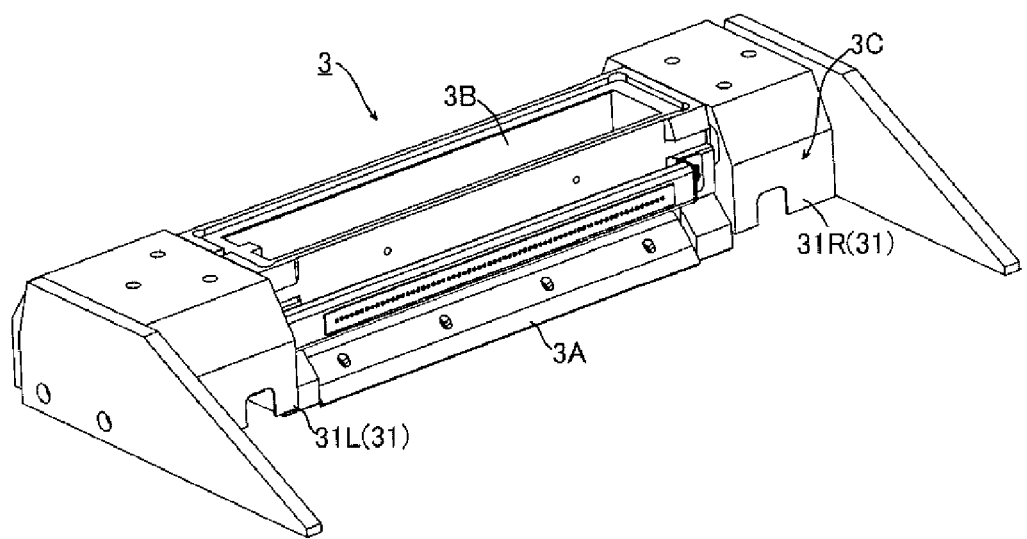
FIG. 3 is a perspective view showing a recoater head of the lamination molding apparatus.

As shown in FIG. 3, the recoater head 3 includes a blade 3A, a material storage box 3B, and a guide mechanism 3C. The recoater head 3 supplies material powder from the material storage box 3B, and moves the blade 3A in a left-right direction along a reference height of an upper surface of the powder layer to flatten the supplied material powder, thereby forming a new powder layer.

A material supply device (not illustrated) that supplies the material powder to the material storage box 3B is provided on an upper side of the blade 3A. During molding of the lamination molded object, the material powder is timely replenished from the material supply device into the material storage box 3B so as to prevent a shortage of the material powder in the material storage box 3B.

As shown in FIG. 2, the guide mechanism 3C includes a pair of bearings 31 composed of bearings 31R and 31L, and a pair of shaft members 32 composed of guide rails 32R and 32L respectively receiving the bearings 31R and 31L. The recoater head 3 is positioned and guided by the guide mechanism 3C to reciprocally move in a horizontal uniaxial direction, specifically, the left-right direction of the lamination molding apparatus 1. By movement of the recoater head 3, supply and flattening of the material powder are performed respectively by the material storage box 3B and the blade 3A provided on the recoater head 3, and the powder layer can be formed.

A laser irradiation device 5 irradiates a predetermined irradiation region in the powder layer with a laser beam, thereby forming a new sintered layer. The laser irradiation device 5 includes a laser scanner 5A including two galvanometer mirrors, a laser oscillator 5B, a focus lens 5C, and a plurality of laser transmission members (not illustrated).

A laser beam outputted from the laser oscillator 5B and having predetermined energy passes through the laser transmission members so as to reach the galvanometer mirrors of the laser scanner 5A. The laser beam reflected by the pair of galvanometer mirrors is converged by the focus lens 5C, and passes through a transmission lens 1D provided in a through hole drilled through a top plate of the molding chamber 1A. The laser beam converged by the focus lens 5C is irradiated on the powder layer with a predetermined spot diameter.

As shown in FIG. 1, a cutting device 7 includes a first moving body 7A capable of reciprocally moving in the left-right direction, a second moving body 7B capable of reciprocally moving in the front-rear direction, and a processing head 7C capable of reciprocally moving in the up-down direction. In addition, a spindle head 8 is provided at a lower part of the processing head 7C. The spindle head 8 is configured rotatable having a cutting tool 9 mounted in a substantial center thereof as viewed from above. A cutting blade 9A for cutting the sintered layer is provided on a tip portion of the cutting tool 9.

The cutting device 7 is capable of being positioned in the left-right direction by the first moving body 7A, in the front-rear direction by the second moving body 7B and in the up-down direction by the processing head 7C. Accordingly, the cutting tool 9 can be freely moved in triaxial directions and can be positioned at any height inside the molding chamber 1A. Then, cutting is performed by application of the cutting blade 9A of the cutting tool 9 that rotates at high speed while moving horizontally.

Figure 5:
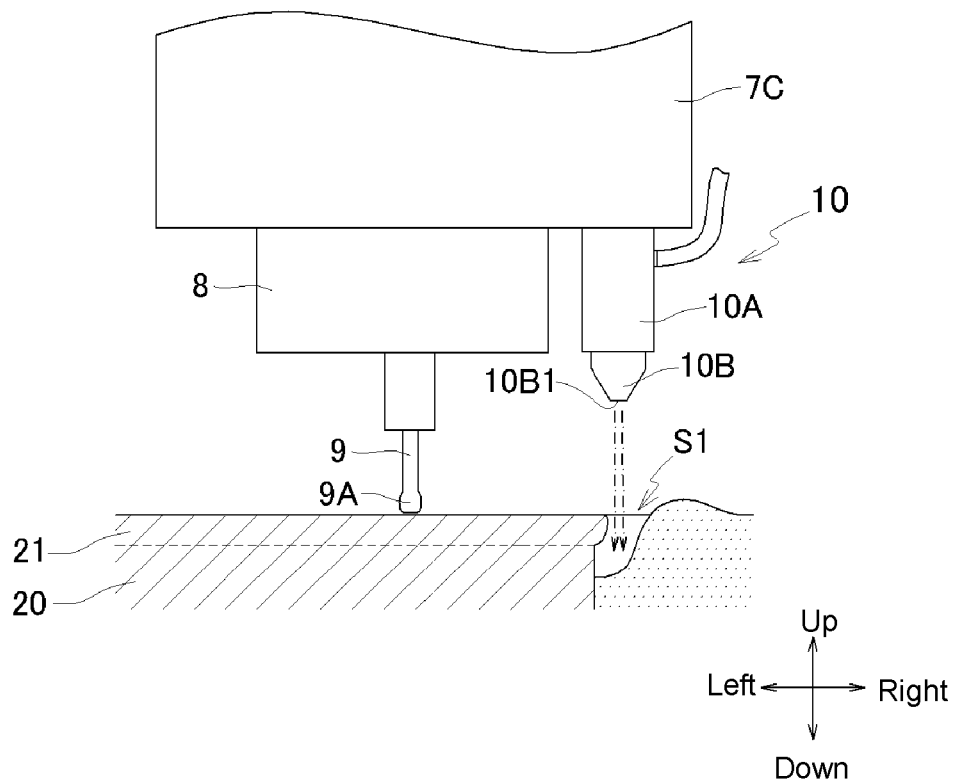
FIG. 5 is a side view of the vicinity of a processing head shown in FIG. 4.

A gas injector 10 is for injecting gas toward the material powder. As shown in FIG. 1 and FIG. 5, the gas injector 10 is disposed in the center of a right end portion of the processing head 7C. The gas injector 10 includes a gas supply portion 10A attached to a lower part of the processing head 7C, and a nozzle 10B attached to a tip of the gas supply portion 10A. Gas is supplied from the inert gas supply device 12 to the gas supply portion 10A. A gas passing hole (not illustrated) is formed communicating central axes of the gas supply portion 10A and the nozzle 10B. The gas supplied from the inert gas supply device 12 to the gas supply portion 10A passes through the gas passing hole (not illustrated), and is blown vertically from a circular nozzle hole 10B1 provided on a tip of the nozzle 10B.

Figure 6:
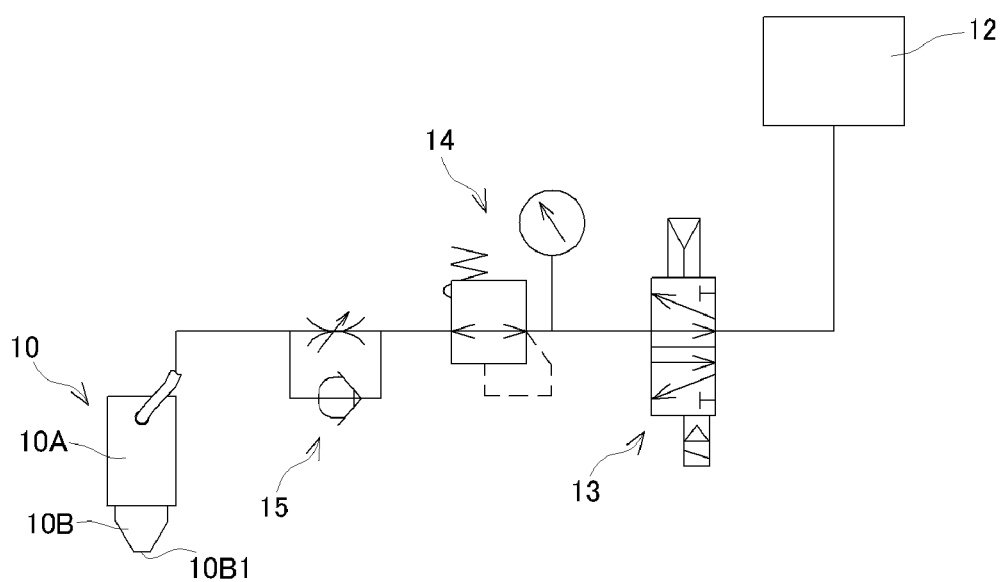
FIG. 6 is a schematic view showing a configuration between an inert gas supply device and a gas injector.

FIG. 6 is a schematic view showing a configuration between the inert gas supply device 12 and the gas injector 10. The supply of gas from the inert gas supply device 12 to the gas injector 10 is controlled by an electromagnetic valve 13. In addition, the pressure of the injected gas is controlled by a regulator 14, and the flow rate of the injected gas is controlled by a speed controller 15.

Next, a process of fabricating a lamination molded object using the lamination molding apparatus 1 is simply explained.

By movement of the recoater head 3 in the left-right direction, while material powder is being supplied from the material storage box 3B to the molding space above the molding table 2A, the material powder is flattened by the blade 3A. A powder layer is accordingly formed, and a sintered layer forming area set for each layer is irradiated with a laser beam, so as to form a sintered layer. After formation of the sintered layer, the molding table 2A is lowered as much as a thickness of a subsequently formed powder layer. Then, on the sintered layer, a new powder layer is formed having a thickness equal to a lowering distance of the molding table 2A, and the sintered layer forming area set for each layer is irradiated with a laser beam, thereby forming another sintered layer. By repeating such operation, a desired lamination molded object is fabricated.

Furthermore, in the present embodiment, in order to obtain a lamination molded object having high form accuracy, every time a sintered body including a sintered layer group consisting of a predetermined number of sintered layers is formed, the lamination molded object is molded while a side surface of the sintered body on which a small hole or a narrow groove is formed is shaved by a cutting device. More specifically, after the material powder in the vicinity of the side surface of the sintered body is removed by a combination of intermittent injection and continuous injection by the gas injector 10, the side surface of the sintered body is shaved by the cutting tool 9.

Hereinafter, actions of the lamination molding apparatus 1 during shaving of the side surface of the sintered body are explained.

Moreover, as shown in FIG. 5, FIGS. 8A~8D, FIG. 11 and FIG. 13, the lamination molded object during molding includes a sintered body group 20 whose side surfaces have been shaved, and a sintered body 21 newly formed on the sintered body group 20. A sintered body is formed by including a shaved part. Thus, the sintered body 21 before shaving has a side surface jutting out relative to the side surfaces of the sintered body group 20. In addition, a small hole 21a and narrow grooves 21b and 21c are formed on the sintered body 21. In the present embodiment, the actions of the lamination molding apparatus 1 during shaving of the side surface of the sintered body 21 are explained with reference to FIG. 4, FIG. 5 and FIG. 7 to FIG. 13.

Figure 4:
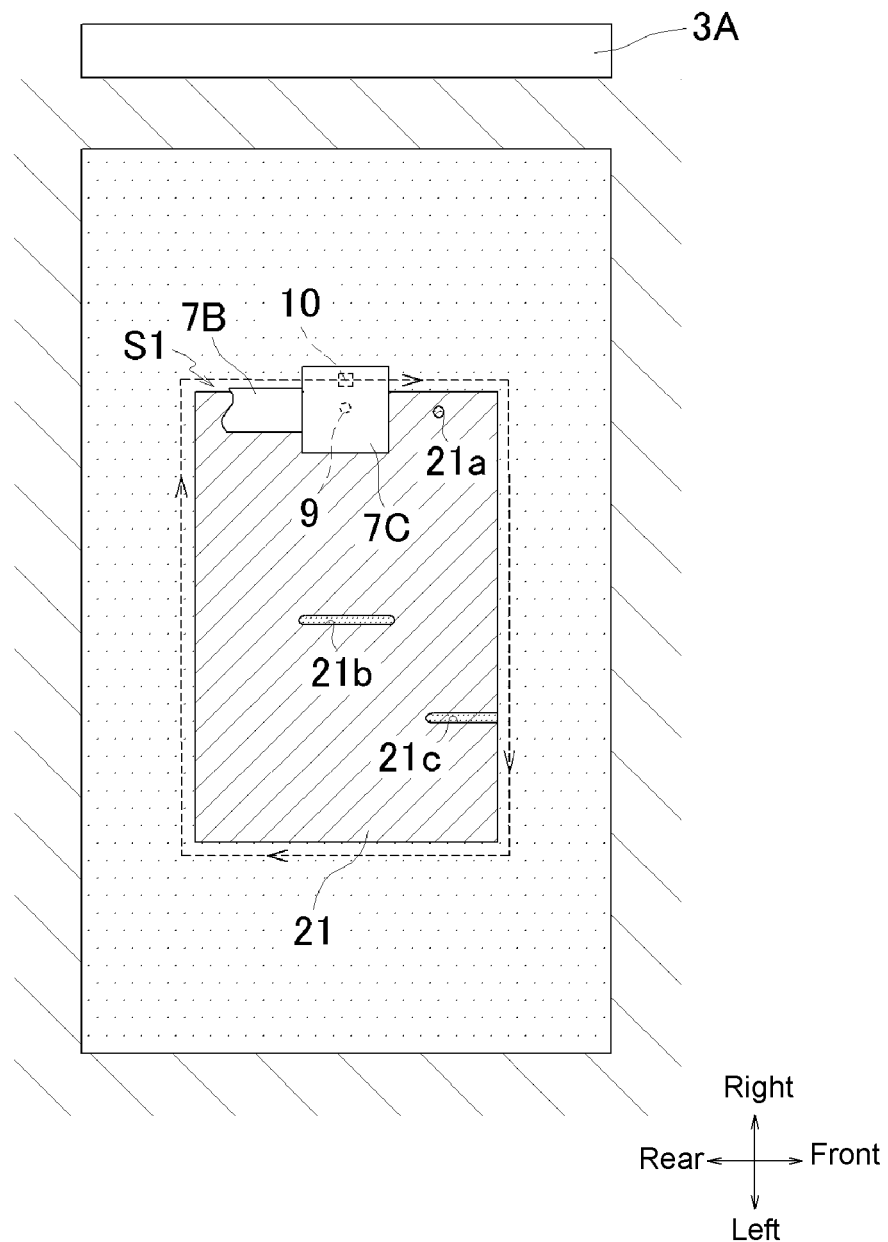
FIG. 4 is a top view of a molding space during gas injection in the vicinity of an outer side surface of a sintered body.

First of all, by adjusting the position of the processing head 7C by the first moving body 7A and the second moving body 7B, the gas injector 10 is moved along an outer side surface as an outline of the sintered body 21, as shown by dashed arrows in FIG. 4. At this moment, as shown by dash-dot arrows in FIG. 5, by continuously injecting gas (hereinafter referred to as continuous injection) from the gas injector 10 and blowing the gas against toward material powder in the vicinity of the outer side surface of the sintered body 21, the material powder is blown off so as to spout out along a traveling direction of the gas injector 10. Accordingly, as shown in FIG. 5, a space S1 is formed through which the cutting blade 9A of the cutting tool 9 proceeds along the outer side surface of the sintered body 21 during cutting.

Figure 7:
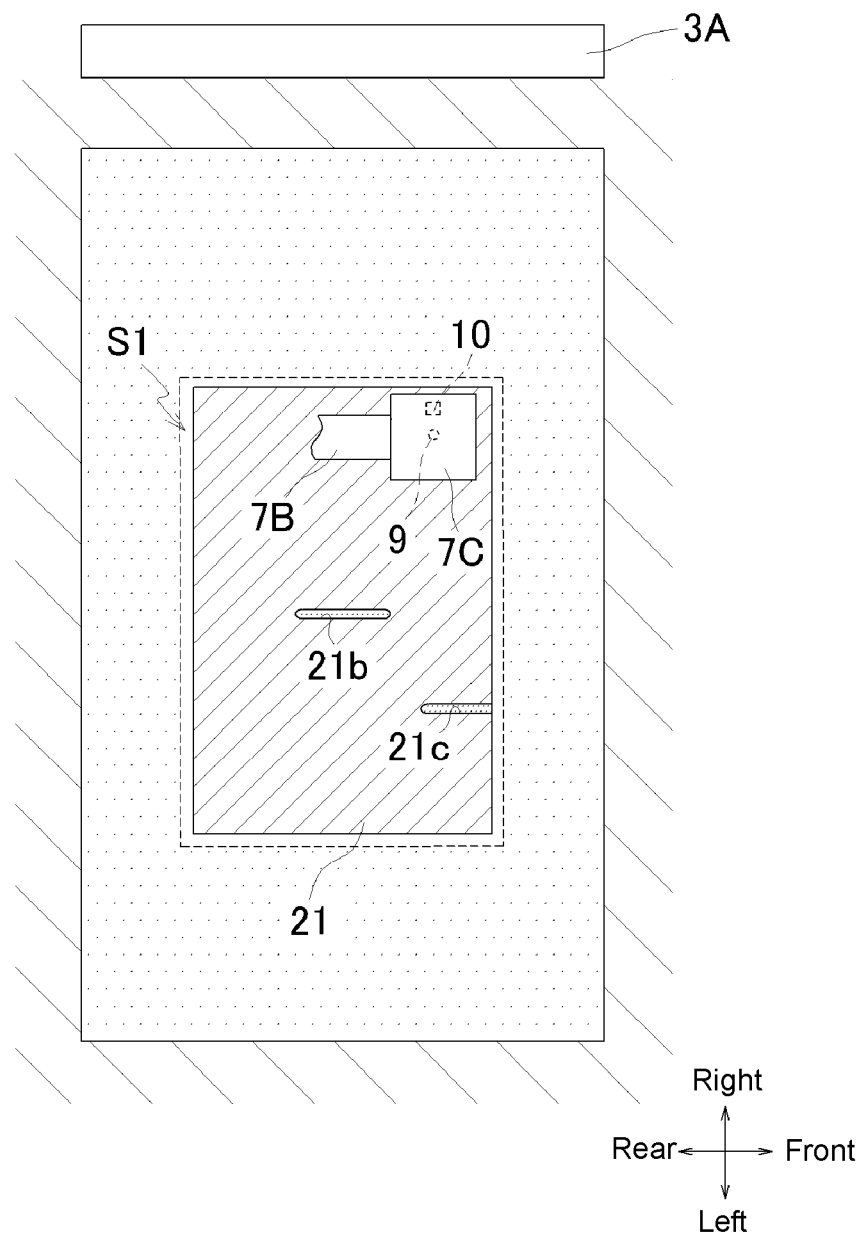
FIG. 7 is a top view of the molding space during gas injection into a hole of the sintered body.
Figure 8A:
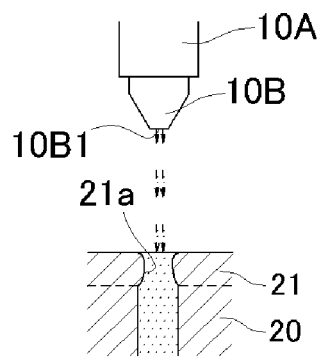
FIG. 8A to FIG. 8D are side views showing a state in which material powder clogged in the hole of the sintered body is removed.
Figure 8B:
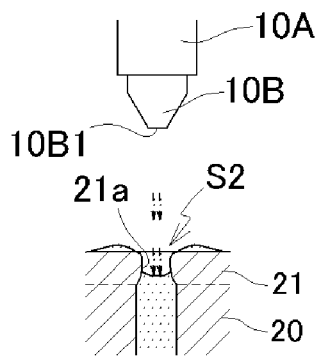
Figure 8C:
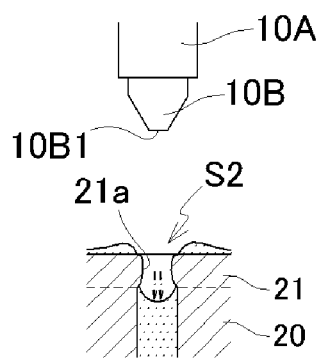
Figure 8D:
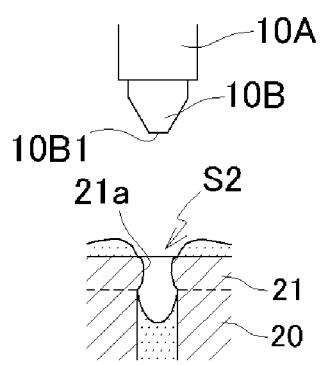
Figure 9:
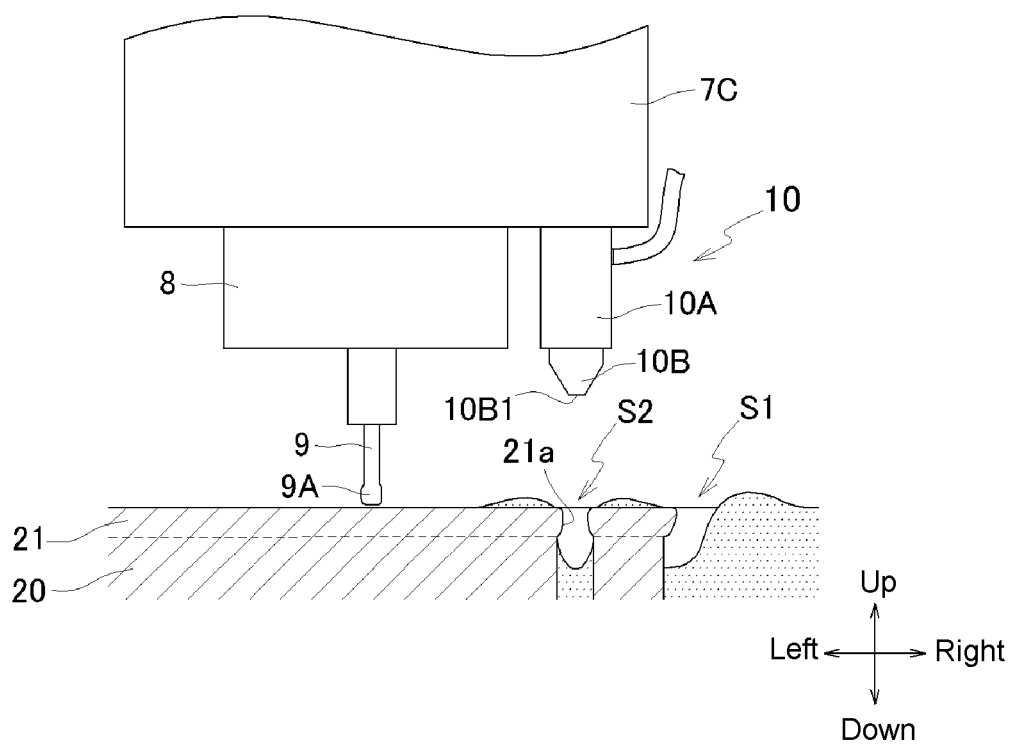
FIG. 9 is a side view of the vicinity of the processing head shown in FIG. 7.

Furthermore, as shown in FIG. 7, the gas is blown against toward the material powder clogged in the small hole 21a on the sintered body 21. More specifically, as shown FIG. 8A to FIG. 8D, the nozzle hole 10B1 of the gas injector 10 is disposed right above the hole 21a. By performing a plurality of times of gas injection (hereinafter referred to as intermittent injection) having a short injection time as shown by dash-dot arrows in FIG. 8A to FIG. 8C, the material powder in the hole 21a is gradually floated in order from an upper side and is blown off outside, so as to form a space S2. Accordingly, the material powder clogged in the hole 21a can be removed. According to the above, as shown in FIG. 9, the space S2 for the cutting blade 9A of the cutting tool 9 to enter during cutting is formed.

In addition, in the case of removing the material powder clogged in the narrow grooves 21b and 21c of the sintered body 21, similarly, the nozzle hole 10B1 of the gas injector 10 is disposed right above the grooves 21b and 21c. By intermittent injection to the material powder clogged in the grooves 21b and 21c, the material powder in the grooves 21b and 21c is blown off in order from the upper side so as to be removed. For example, if a groove is long in the front-rear direction like the grooves 21b and 21c, by repeating the above-mentioned actions along the front-rear direction from a rear end to a front end while shifting a position against which the gas is blown, the material powder clogged in the grooves 21b and 21c can be removed. According to the above, as shown in FIG. 10, spaces S3 and S4 are formed through which the cutting blade 9A of the cutting tool 9 proceeds during cutting.

Moreover, the nozzle hole 10B1 of the gas injector 10 has a caliber of 1 mm. The nozzle hole 10B1 is disposed 30 mm away from an upper surface of the sintered body 21 as a reference plane. A blow-out pressure of the gas injected from the nozzle hole 10B1 is in the range of 0.1 to 0.5 MPa. According to this range, since the material powder can be removed by blow-off to a depth of about 10 mm using the upper surface of the sintered body 21 as the reference plane, the spaces S1 to S4 having a sufficient depth for the cutting blade 9A of the cutting tool 9 to enter can be formed in the vicinity of the side surface of the sintered body 21. In addition, the number of times of gas injection in the intermittent injection is once to twice per second.

Figure 10:
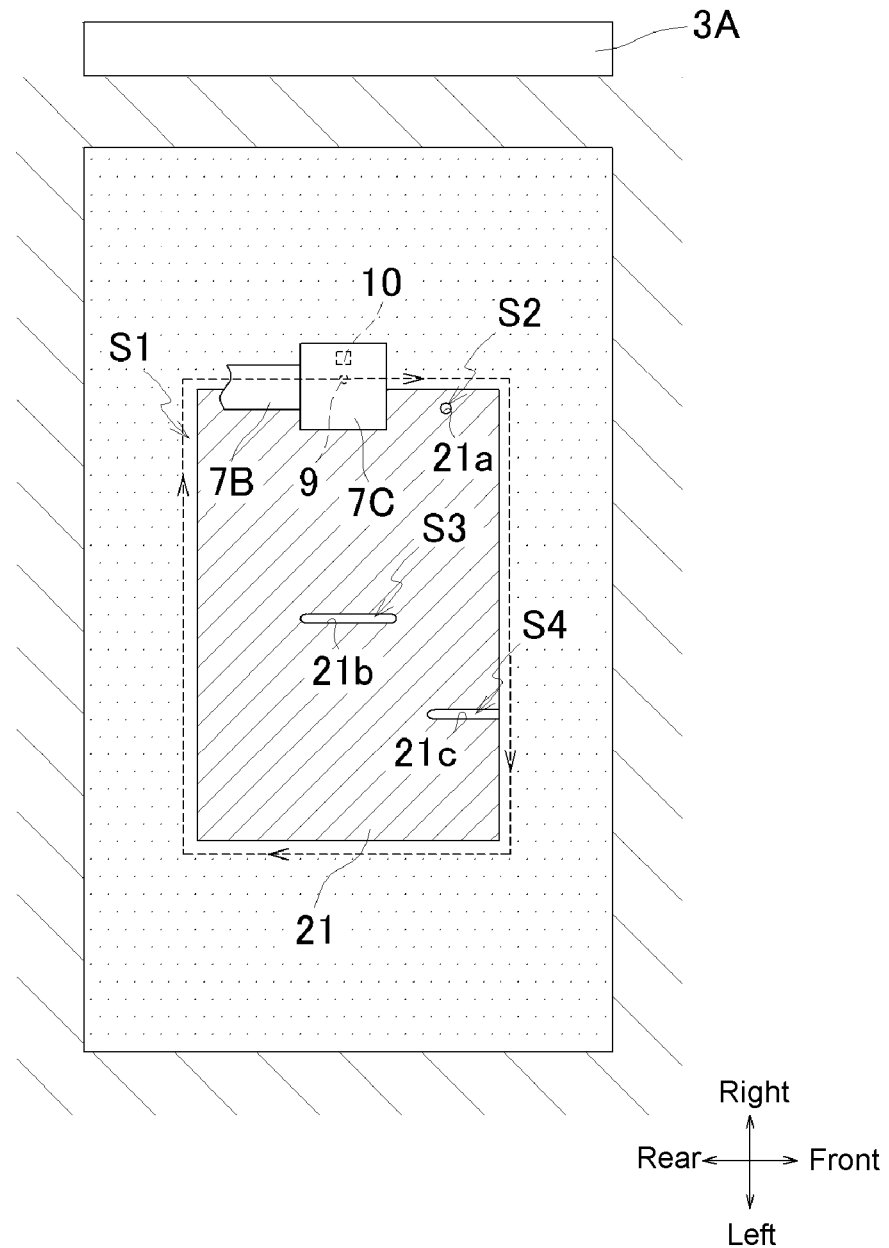
FIG. 10 is a top view of the molding space during cutting of the outer side surface of the sintered body.
Figure 11:
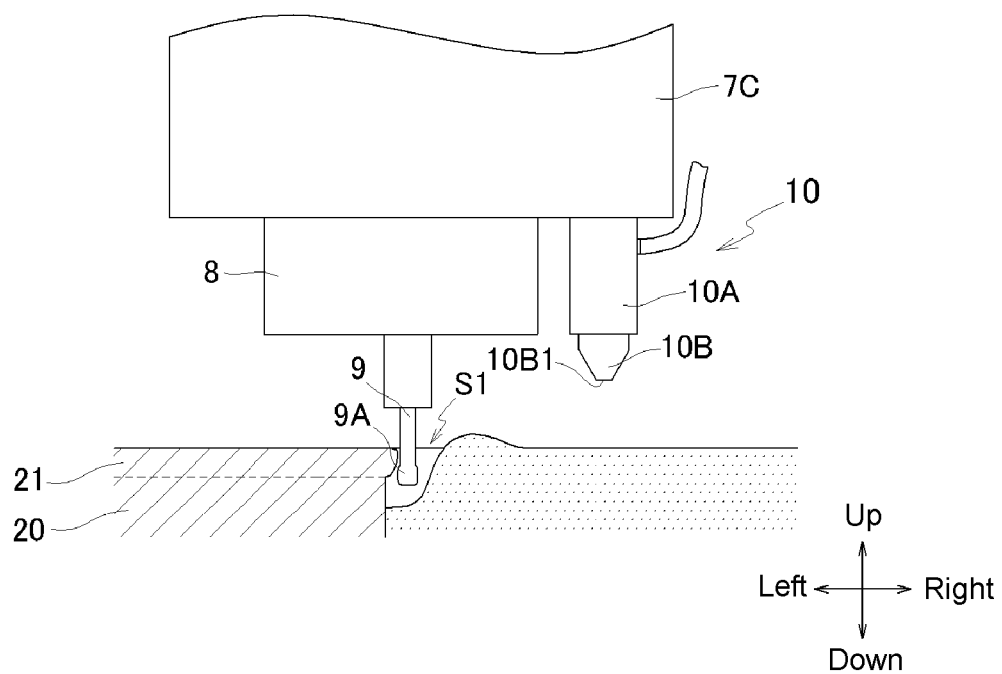
FIG. 11 is a side view of the vicinity of the processing head shown in FIG. 10.

Next, by adjusting the position of the processing head 7C by the first moving body 7A and the second moving body 7B, the cutting blade 9A of the cutting tool 9 is moved by the above-mentioned gas injection along the space S1 formed along the outer side surface of the sintered body 21, as shown by dashed arrows in FIG. 10. At this moment, as shown in FIG. 11, by application of the cutting blade 9A of the cutting tool 9 that rotates at high speed, the outer side surface of the sintered body 21 is shaved.

Figure 12:
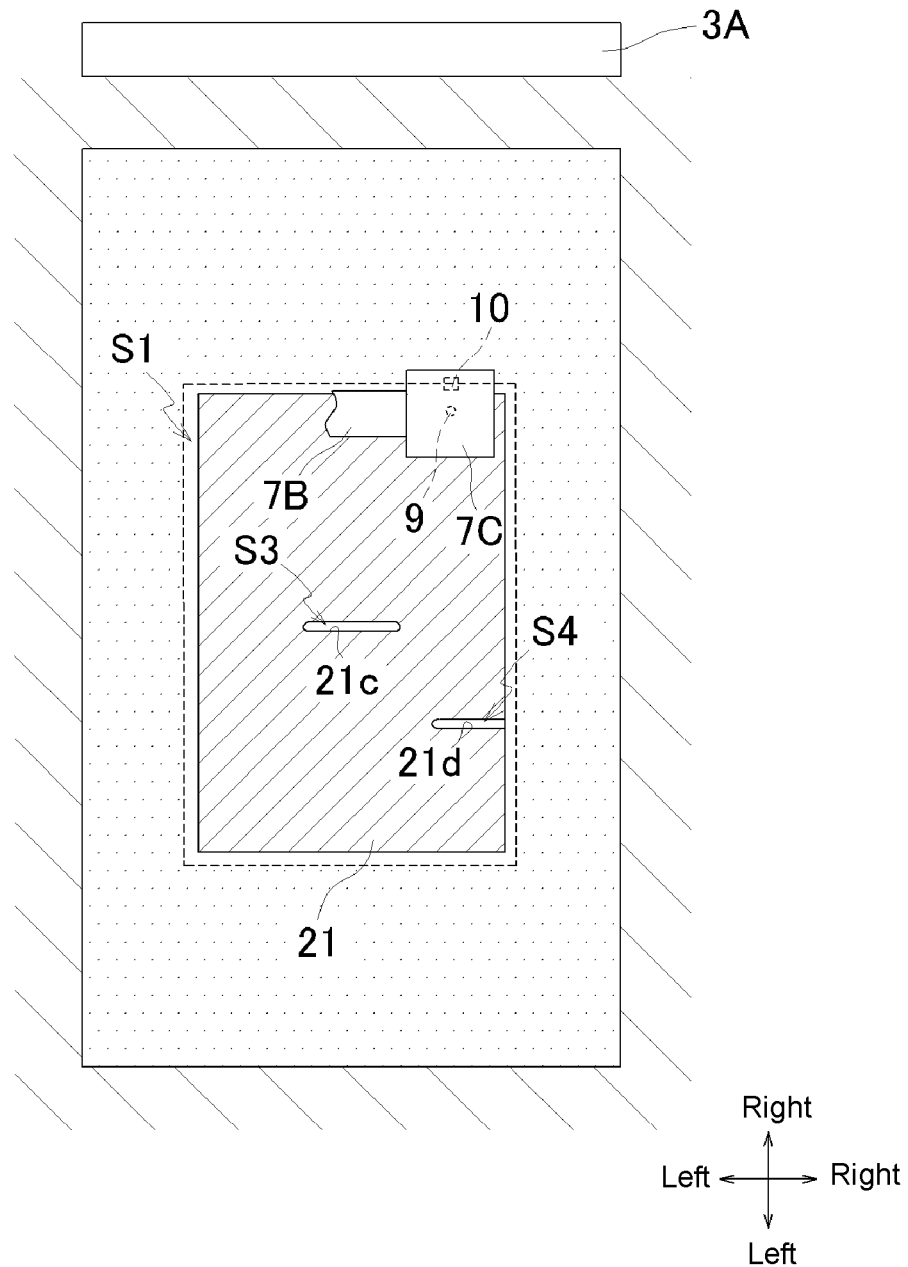
FIG. 12 is a top view of the molding space during cutting of a side surface of the hole of the sintered body.
Figure 13:
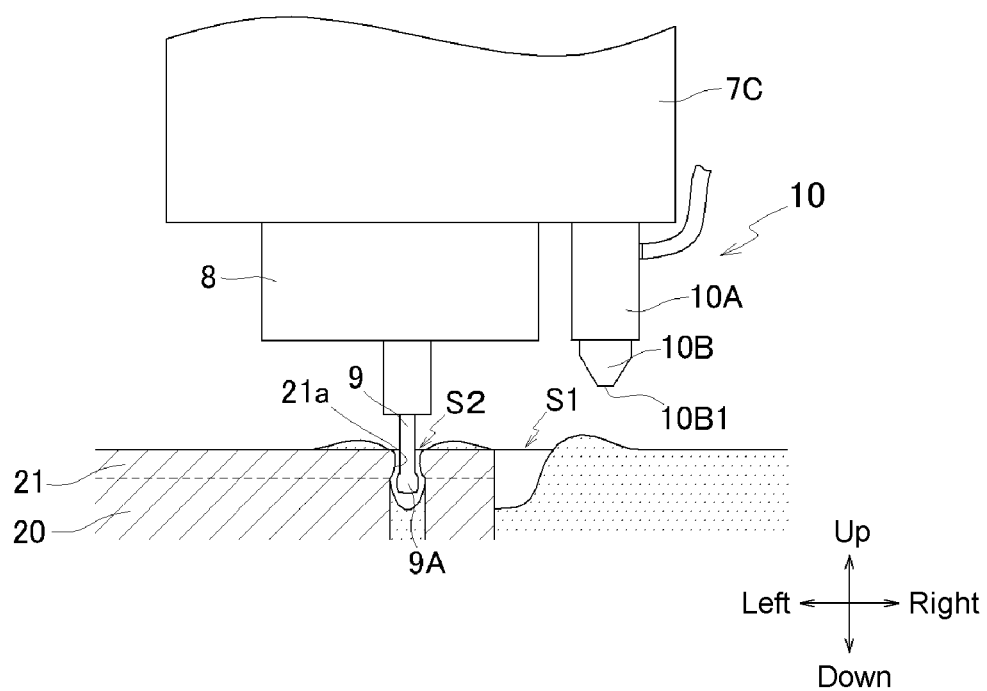
FIG. 13 is a side view of the vicinity of the processing head shown in FIG. 12.

Furthermore, as shown in FIG. 12 and FIG. 13, with respect to the hole 21a and the grooves 21b and 21c of the sintered body 21, similarly, the cutting blade 9A of the cutting tool 9 is moved along the spaces S2 to S4 formed by gas injection. At this moment, by application of the cutting blade 9A of the cutting tool 9 that rotates at high speed, side surfaces of the hole 21a and the grooves 21b and 21c of the sintered body 21 are shaved.

(Effects)

In the present embodiment, by intermittent injection performed by the gas injector 10, the material powder clogged in the small hole 21a or the narrow grooves 21b and 21c of the sintered body 21 is removed. Accordingly, the material powder in the hole 21a or the grooves 21b and 21c is gradually floated in order from the upper side and is blown off outside, and the material powder clogged therein can be removed. According to the above, since the spaces S2 to S4 having a sufficient depth for the cutting blade 9A of the cutting tool 9 to enter can be formed in the hole 21a or the grooves 21b and 21c, during side surface cutting of the sintered body 21, the material powder can be prevented from biting into the cutting blade 9A of the cutting tool 9. Accordingly, the cutting blade 9A of the cutting tool 9 can be prevented from being damaged.

In addition, continuous injection is performed on the material powder in the vicinity of the outer side surface of the sintered body 21, and intermittent injection is performed on the material powder clogged in the small hole 21a or the narrow grooves 21b and 21c of the sintered body 21. That is, for the material powder in a wide region from which removal of material powder is easy, the continuous injection having a fast removal speed is performed; for the material powder in a narrow region from which removal of material powder is difficult, the intermittent injection having high removal capability is performed. Accordingly, the material powder is more efficiently and reliably removed, and the spaces S1 to S4 can be formed through which the cutting blade 9A of the cutting tool 9 proceeds.

In addition, the caliber of the nozzle hole 10B1 of the gas injector 10 is 1 mm. The nozzle hole 10B1 is disposed 30 mm away from the upper surface of the sintered body 21 as the reference plane. The blow-out pressure of the gas injected from the nozzle hole 10B1 is in the range of 0.1 to 0.5 MPa. According to this range, the material powder can be removed to a depth of about 10 mm using the upper surface of the sintered body 21 as the reference plane. Accordingly, during side surface cutting, since the spaces S1 to S4 having a sufficient depth for the cutting blade 9A of the cutting tool 9 to enter can be formed in the vicinity of the side surface of the sintered body 21, the material powder can be prevented from biting into the cutting device 7 when the sintered body 21 is subjected to side surface cutting. In addition, the material powder in the vicinity of the side surface of the sintered body 21 can be blown off without blowing up the material powder blown off by the gas. Accordingly, while a good molding environment is maintained, the material powder is removed from the vicinity of the side surface of the sintered body 21, and the spaces S1 to S4 can be formed through which the cutting blade 9A of the cutting tool 9 proceeds.

In addition, the nozzle hole 10B1 of the gas injector 10 has a circular shape, and the gas injected from the nozzle hole 10B1 is blown vertically. Accordingly, size of the space formed by gas injection can be easily controlled. Thus, the material powder is prevented from being removed more than necessary, and the material powder replenished thereon when forming a new powder layer can be reduced.

Although a preferred embodiment of the invention has been explained above, the invention is not limited to the above-mentioned embodiment or example, and various design changes can be made without departing from the scope as claimed.

Although the present embodiment describes that the gas injected from the gas injector 10 is injected vertically toward the material powder, the direction in which the gas is injected may not necessarily be a vertical direction.

In addition, although the present embodiment describes a case in which the material powder is removed by a combination of intermittent injection and continuous injection, in a sintered body having a complex side surface shape on which a large number of small holes or narrow grooves are formed, for example, the material powder may be removed only by intermittent injection.

In addition, although the present embodiment describes a case in which the material powder clogged in the small holes or narrow grooves that form an outer shape of the lamination molded object is blown off by intermittent injection, in order to maintain a hole formed on the sintered body for a purpose different from appearance of the lamination molded body, such as a cooling passage or the like, the material powder clogged therein may be removed by intermittent injection.

What is claimed is:

1. A lamination molding apparatus comprising
a table, on which a powder layer comprising metal material powder is formed;
a recoater head, disposed on the table and including a blade that moves in a left-right direction along a reference height of an upper surface of the powder layer to flatten the metal material powder;
a laser irradiation device, configured to irradiate a predetermined region of the powder layer formed on the table with a laser beam configured to sinter the predetermined region of the powder layer to form a sintered layer;
an inert gas supply device, configured to supply a gas;
a gas injector, the gas supplied from the inert gas supply device is injected toward a vicinity of a side surface of a sintered body consisting of a predetermined number of sintered layers;
an electromagnetic valve, provided on a connecting pipe connecting the inert gas supply device and the gas injector, and configured to control the gas supplied from the inert gas supply device to the gas injector;
a cutting device, having a cutting tool configured to cut the side surface of the sintered body, wherein the cutting device includes a first moving body configured to reciprocally move in the left-right direction and a second moving body configured to reciprocally move in a front-rear direction; and
a processing head, on which the gas injector and the cutting device are disposed, configured to reciprocally move in an up-down direction and adjust a position of the processing head by the first moving body configured to reciprocally move in the left-right direction and the second moving body configured to reciprocally move in the front-rear direction,
wherein the gas injector and the cutting tool of the cutting device are disposed in the up-down direction with respect to the table and arranged side by side and parallel to each other on the processing head,
wherein the electromagnetic valve is configured to control the gas injector perform a continuous injection which continuously injects the gas by injecting greater than 1 second per injection toward metal material powder in the vicinity of the side surface of an outer side surface of the sintered body, wherein the gas injector is configured to move along the outer side surface as an outline of the sintered body by adjusting the position of the processing head, and perform an intermittent injection which repeats short-time gas injection by injecting the gas once to twice per second toward metal material powder in the vicinity of the side surface of a hole or a groove of the sintered body, and wherein a nozzle hole of the gas injector is disposed right above of the sintered body by adjusting the position of the processing head.

2. The lamination molding apparatus according to claim 1, wherein the gas injector blows off by gas injection the metal material powder at least to a depth where a cutting blade of the cutting tool is entered.

3. The lamination molding apparatus according to claim 1, wherein a blow-out pressure of the gas injection is in the range of 0.1 to 0.5 MPa.

4. The lamination molding apparatus according to claim 1, wherein a gas injection port of the gas injector has a circular shape, and
the gas injected from the gas injection port is blown vertically.

5. The lamination molding apparatus according to claim 1, wherein the gas injector is configured to perform the continuous injection which removes the metal material powder in the vicinity of the side surface of the outer side surface of the sintered body, and
the gas injector is configured to perform the intermittent injection which removes the material powder in the vicinity of the side surface of the hole or the groove of the sintered body.

* * * * *